Jan. 17, 1928. 1,656,349
M. E. GARRISON
COMBINATION BACK PRESSURE AND VACUUM RELIEF VALVE
Filed Feb. 18, 1924
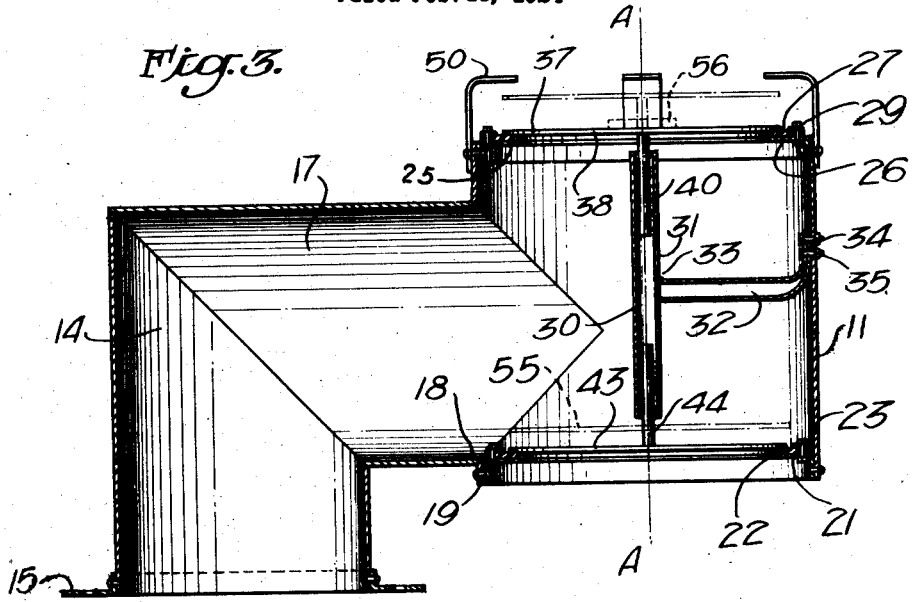
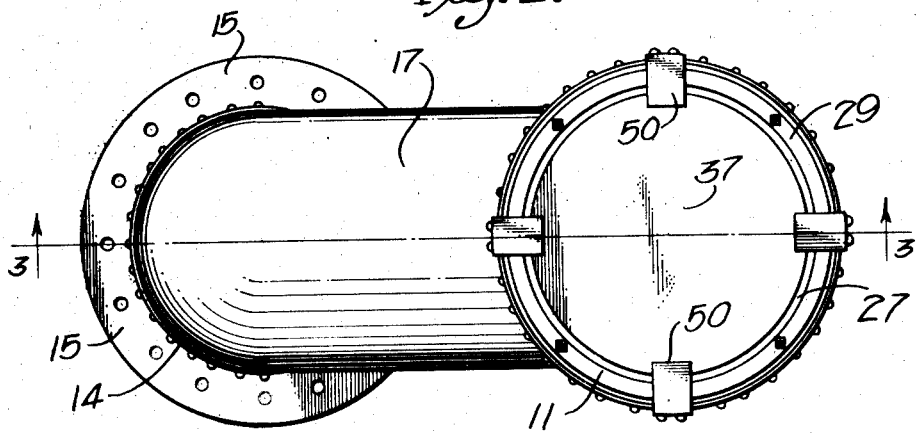
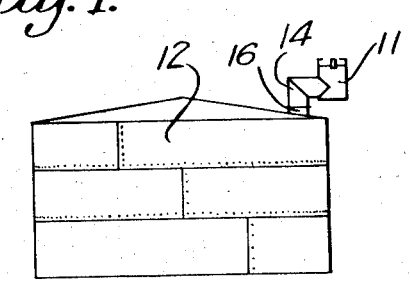
INVENTOR:
MURRAY E. GARRISON,
BY
ATTORNEYS.

Patented Jan. 17, 1928.

1,656,349

UNITED STATES PATENT OFFICE.

MURRAY E. GARRISON, OF LOS ANGELES, CALIFORNIA.

COMBINATION BACK PRESSURE AND VACUUM RELIEF VALVE.

Application filed February 18, 1924. Serial No. 693,726.

This invention relates to relief valves intended for controlling pressures within receptacles and has its particular application in the oil industries in the manner hereinafter described.

Although the device may be employed on tanks in which various other liquids are stored, the single application thereof to oil storage tanks will fully demonstrate the utility of the invention. Crude oils as delivered from the well contain large quantities of volatile material such as the lighter fuel hydrocarbons. In order to prevent pressures within the tank which might prove destructive, it is customary to provide a small vent opening in the storage tank through which gas may escape. It will be recognized that when an open vent is used, the pressure on the interior of the tank is the same as the surrounding atmospheric pressure.

Many of the volatile hydrocarbons evaporate very slowly in the air and still more slowly when under pressure. By placing a pressure on the storage tanks, it is possible to retain a maximum quantity of volatile constituents in the oil. The invention provides a means whereby a pressure is continuously maintained in the tank, this pressure being regulated so as not to exceed the strength or resistance of the tank. The pressure exerted, however, is sufficient to considerably reduce evaporation.

Serious strains are often placed on oil storage tanks when they are being filled or discharged due to the fact that the small vent which is commonly employed is too small to permit a free flow of air therethrough, thus causing excessive pressures in the tank when oil is being pumped thereinto at high velocity, and dangerous conditions of vacuum which tend to collapse the tank when the oil is being discharged therefrom. The invention provides a special form of valve having a closure member arranged to open outwardly and to allow the discharge of gas therethrough when the internal pressure within the tank exceeds a pre-designated safe value. The valve also provides a closure plate arranged to open inwardly when the condition of vacuum within the tank due to oil being discharged therefrom exceeds a predetermined value which is calculated from the massiveness of structure of the storage tank.

The especial advantages of the invention and further objects thereof will be made evident hereinafter.

Referring to the drawing which is for illustrative purposes only:

Fig. 1 is an elevational view showing a tank equipped with an embodiment of my invention.

Fig. 2 is an enlarged plan view of the relief valve.

Fig. 3 is a section taken on a plane represented by the line 3—3 of Fig. 2.

As shown in the drawing, the invention employs a tubular shell 11 preferably constructed of light metal plates and disposed with the axis A—A thereof in substantially vertical position. For the purpose of providing communication between the shell 11 and the storage tank 12, an elbow 14 is employed having a flange 15 on the downwardly extending leg thereof whereby attachment may be made to a saddle flange or other connecting means 16 secured in the top of the tank 12. The lateral leg 17 of the elbow 14 connects directly into the shell 11 at a point slightly below the center thereof as shown so that the lower edge 18 of the pipe 17 is but a short distance from the lower edge 19 of the shell 11. A valve seat is provided in the lower end of the tubular member 11, this valve seat being in the form of a ring 21 having an annular gasket 22 of wool felt or other similar material secured on the upper face thereof by a securing ring 23. The upper opening of the member 11 is equipped with a valve seat 25, consisting of a supporting ring 26 having a wool gasket member 27 secured on the upper face thereof by a ring 29. Centrally within the tubular member 11, there extends a guide member 30 consisting simply of a vertically positioned pipe 31 supported by a pipe 32, welded thereto as indicated at 33 and having the end 34 thereof flattened and bent into vertical extension so as to be bolted as shown at 35 to the member 11. An upper valve closure member 37 consisting of a circular plate 38 is arranged to rest in edge engagement on the gasket 27, as shown, and has a stem 40 extending downwardly from the center thereof into the upper end of the tubular guide 30, which serves to centralize the plate 38 relative to the valve opening and to hold it in substantially horizontal position. A lower closure plate 43 rests on the gasket 22 and has a stem 44 extending upwardly into the lower end of the member 30 so as to be centralized and guided thereby.

Steel tanks will resist varying internal and external pressures according to the strength of the structure. The safe internal pressure for the tank is determined and the weight of the closure member 37 designed accordingly. The external pressure which the tank will safely resist is also computed and the lower closure member designed accordingly.

It will be noticed that the shell 11 is of larger diameter than the pipe 17 and the vertical leg of the elbow 14, thus enabling the making of the valve openings through the valve seats of the same diameter as the opening through elbow members. When the tank is being filled with oil which generally occurs at high velocity, the air and gas therein are compressed by the rising level of oil, overcoming the resistance due to the weight of the closure member 37 which forces this member upwardly, and escape through the upper valve opening, the upward movement of the plate 38 being limited by bracket arms 50 bolted or otherwise secured in the position shown. When the exit of air and gas stops, the plate 38 drops back against the valve seat 37 and prevents further passage and holds a pressure on the interior of the tank. If due to high temperature, the evaporation of volatile materials should become excessive and the pressure thereof exceed the predetermined value, the closure member 37 will be raised by the internal pressure, thus allowing the gas to escape.

Vacuum conditions may be caused in the ordinary storage tank either due to the discharge of oil therefrom or due to change in temperature causing condensation of vaporized hydrocarbons. When the condition of vacuum within the tank exceeds the resistance of the plate 43, it will be raised as indicated by the dotted lines 55, Fig. 3, thus allowing the entrance of air into the tank. The valve opening provided by the valve seat 21 is of ample size to care for an intake of air equal to or greater than the discharge of the oil from the tank.

In event, that it is desired to place additional pressure on the interior of the storage tank, weights may be employed on the closure member 37 as indicated by the dotted lines 56, thus affording a greater resistance of the outlet valve against being opened by internal pressure. It will be noticed that the upper face of the valve seat 21 is situated on or above the level of the lower edge 18 of the pipe 17 so that any liquids condensing within the member 11 will be drained into the tank through the elbow 14 and will, therefore, in no way effect the action of the lower valve member 43.

Substantially all parts of my novel valve may be formed of sheet metal, and the parts thereof may be secured together by soldering or welding, or riveting, light construction being favorable to manufacture and sale at a comparatively low price. My use of wool felt in the gaskets 22 and 27 is especially advantageous on account of the fact that this material retains its resiliency or "life" even when exposed to oil in either vapor or liquid form.

Although, I have herein described one complete embodiment of my invention, it will be understood that various features thereof might be independently employed and also that various modifications might be made by those skilled in the art, without the slightest departure from the spirit and scope of my invention as the same is indicated above and in the following claims.

I claim as my invention:

1. In a device of the character described, the combination of: a vertically disposed tubular member; a pipe member connecting in the side of said tubular member, for communication with a storage tank; an outwardly disposed valve seat at the upper end of said tubular member; an inwardly disposed valve seat at the lower end of said tubular member, the face of said inwardly disposed valve seat being above the level of the lower edge of said connecting pipe; a closure member for said upper valve seat arranged to open under an internal pressure in excess of a predetermined value; and a closure member for said lower valve seat arranged to open under a reduced internal pressure of a predetermined value.

2. In a device of the character described, the combination of: a vertically disposed tubular member; a pipe member connecting in the side of said tubular member, for communication with a storage tank; an outwardly disposed valve seat at the upper end of said tubular member; an inwardly disposed valve seat at the lower end of said tubular member, the face of said inwardly disposed valve seat being above the level of the lower edge of said connecting pipe; a guide member axially disposed in said tubular member; an upper valve plate having a stem extending downwardly into the upper end of said guide member; and a lower valve plate having a stem extending upwardly into lower end of said guide member.

3. In a device of the character described, the combination of: a vertically disposed tubular member; a pipe member connecting in the side of said tubular member, for communication with a storage tank; an outwardly disposed valve seat at the upper end of said tubular member; an inwardly disposed valve seat at the lower end of said tubular member; a guide member axially disposed in said tubular member; an upper valve plate having a stem extending downwardly into the upper end of said guide member; and a lower valve plate having a stem extending upwardly into lower end of said guide member.

4. In a device of the character described, the combination of: a vertically disposed tubular member; a pipe member connecting in the side of said tubular member, for communication with a storage tank; an outwardly disposed valve seat at the upper end of said tubular member; an inwardly disposed valve seat at the lower end of said tubular member, the face of said inwardly disposed valve seat being above the level of the lower edge of said connecting pipe; a closure member for said upper valve seat arranged to open under an internal pressure in excess of a predetermined value; and a closure member for said lower valve seat arranged to open under a reduced internal pressure of a predetermined value, said tubular member and said pipe member both being formed of sheet metal.

In testimony whereof, I have hereunto set my hand at Los Angeles, California, this 12th day of February, 1924.

MURRAY E. GARRISON.